United States Patent [19]

Hurley

[11] Patent Number: 4,793,186

[45] Date of Patent: Dec. 27, 1988

[54] MONITORING OF EXCITER SHAFT TORSIONAL VIBRATIONS

[75] Inventor: Joseph D. Hurley, Casselberry, Fla.

[73] Assignee: Westinghouse Electric Corp., Pittsburgh, Pa.

[21] Appl. No.: 110,986

[22] Filed: Oct. 21, 1987

[51] Int. Cl.$^4$ .............................................. G01H 1/10
[52] U.S. Cl. ....................................... 73/650; 73/660
[58] Field of Search .................................. 73/650, 660

[56] References Cited

U.S. PATENT DOCUMENTS

| 2,396,540 | 3/1946 | Stansfield | 73/650 |
|---|---|---|---|
| 3,885,420 | 5/1975 | Wolfinger | 73/650 |
| 4,137,780 | 2/1979 | Wolfinger | 73/650 |
| 4,152,636 | 5/1979 | Gordon | 322/25 |
| 4,168,516 | 9/1979 | Lace | 361/241 |
| 4,317,371 | 3/1982 | Wolfinger | 73/650 |
| 4,458,536 | 7/1984 | Ahn et al. | 73/652 |
| 4,587,436 | 5/1986 | Cronin | 307/21 |

OTHER PUBLICATIONS

Hurley, J. D. et al., "Torsional Monitor Equipment for Turbine Generator Units", Proc. of the Am. Power Conference, vol. 41 (1979).

Primary Examiner—Stewart J. Levy
Assistant Examiner—Lawrence G. Fess

[57] ABSTRACT

Apparatus and method for detecting torsional vibrations of the shaft of an exciter of a turbine-generator, according to which a permanent magnet generator is connected to be driven by the exciter shaft and has an electrical output for providing an output voltage having a frequency proportional to the rate of rotation of the exciter shaft; and the electrical output is connected to signal processing circuitry serving to derive a signal representative of torsional vibrations experienced by the exciter shaft.

10 Claims, 1 Drawing Sheet

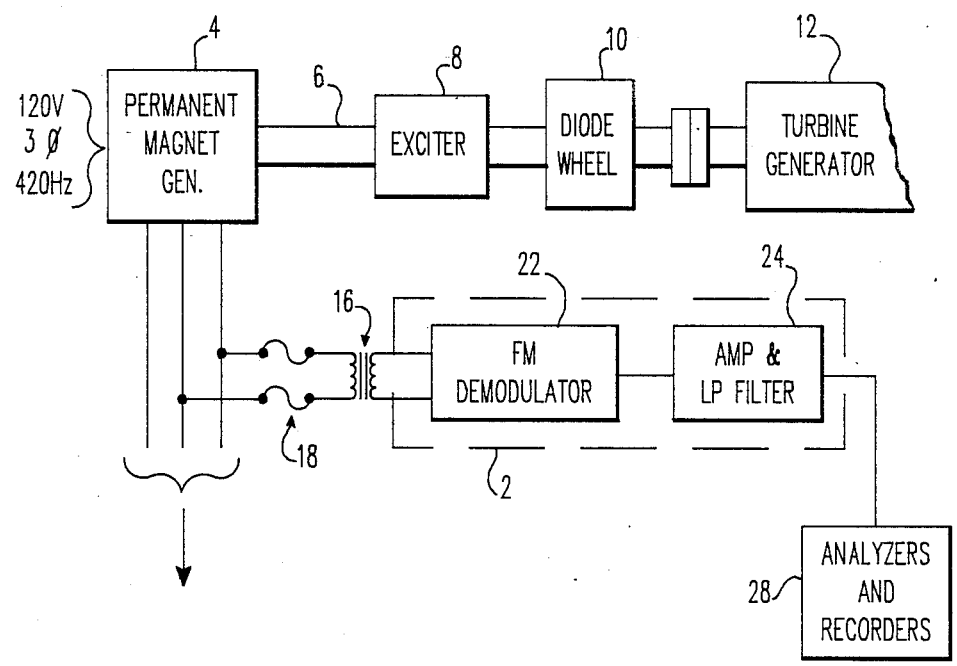

MONITORING OF EXCITER SHAFT TORSIONAL VIBRATIONS

BACKGROUND OF THE INVENTION

The present invention relates to a method and circuit for monitoring the torsional vibrations of the shaft of an exciter of a turbine-generator.

In order to ensure the reliability of a turbine-generator, it is necessary to accurately determine its torsional natural frequencies in the range of approximately 5 to 130 Hz. For many turbine-generators, the torsional frequency response of the rotating exciter is considered to be a critical torsional design factor and the torsional motion of the exciter shaft must be measured during such a monitoring procedure.

It is already known in the art to measure exciter torsional motion by providing a special toothed wheel which rotates with the exciter shaft and a magnetic pickup which produces a signal having a frequency proportional to the instantaneous rate of rotation, or speed, of the toothed wheel. If a torsional vibration is present, the instantaneous shaft speed varies, thereby modulating the frequency of the magnetic pickup signal. An analog signal representative of the torsional motion is derived by frequency demodulation of the magnetic pickup signal.

While this technique produces a useful result, toothed wheels and magnetic pickups are costly and their installation often requires additional system down-time.

SUMMARY OF THE INVENTION

It is an object of the present invention to reduce the hardware required to measure the torsional motion of the exciter of a turbine generator.

A more specific object of the invention is to eliminate the need for a toothed wheel and magnetic pickup to perform this measurement.

The above and other objects are achieved, according to the invention, by a novel apparatus and method for detecting torsional vibrations of the shaft of an exciter of a turbine-generator, according to which a permanent magnet generator is connected to be driven by the exciter shaft and has an electrical output for providing an output voltage having a frequency proportional to the rate of rotation of the exciter shaft; and the electrical output is connected to signal processing circuitry serving to derive a signal representative of torsional vibrations experienced by the exciter shaft.

Thus, according to the invention, the torsional motion of the shaft associated with the exciter is monitored on the basis of an output phase voltage of the permanent magnet generator. When a turbine generator system already includes a shaft driven permanent magnet generator, as is commonly true, the invention can be implemented simply by connecting suitable demodulating and filtering circuitry to one permanent magnet generator output phase.

Heretofore, permanent magnet generators in a turbine-generator system were only considered to be power sources.

DESCRIPTION OF THE PREFERRED EMBODIMENTS

The sole FIGURE shows one embodiment of the invention composed of an analog signal processing circuit 2 connected across one output phase of a permanent magnet generator 4. Generator 4 is driven via a shaft 6 which is also constitutes the rotating shaft of an a.c. exciter 8, a diode wheel 10 and a turbine-generator 12. Generator 4 produces a three-phase output voltage which is the source of excitation power for exciter 8.

Torsional vibrations experienced by the portion of shaft 6 associated with exciter 8 will be transmitted to generator 4 in such a manner as to influence the instantaneous frequency of the output voltage produced by generator 4.

In known systems, the permanent magnet generator 4 is mounted on shaft 6 adjacent exciter 8. In order for the output voltage of generator 4 to accurately reflect the torsional movements of the portion of shaft 6 associated with exciter 8, there is some advantage to not having too great an axial distance between generator 4 and exciter 8. By way of example, if shaft 6 had a diameter of the order of 23 cm, which would be selected for a large turbine-generator, the axial distance between generator 4 and exciter 8 could be of the order of 60 cm. However, a larger spacing would not significantly impair the value of the resulting measurements.

In order to produce a measurement of such torsional movements, one output voltage phase of generator 4 is applied to circuit 2 via a transformer 16, which may be a step-down transformer, and appropriate fuses 18, if desired. The transformation ratio of transformer 16 depends on the relation between the generator output voltage and the input characteristics of circuit 2.

Circuit 2 is composed essentially of an FM demodulator 22 and a circuit unit 24 composed of an amplifier and low-pass filter which produces an output analog signal varying in amplitude in proportion to variations in the frequency of the output signal from generator 4 and thus to variations in the rate of rotation of shaft 6.

The output analog signal from circuit unit 24 can then be applied to suitable recorders and analyzers 28 for analysis in a conventional manner.

Normally, the frequency of the output signal from permanent magnet generator 4 will be only slightly greater than the maximum torsional vibration frequency to be monitored. For example, the generator output signal frequency could nominally be 420 Hz and might drop to a minimum value of 210 Hz, while the upper torsional vibration frequency limit of interest is of the order of 130 Hz.

To assure proper operation of circuit 2, it is primarily important that demodulator 22 be tuned to the output frequency range of generator 4 and that the cut-off frequency of circuit unit 24 be accurately set. By way of example, the construction of demodulator 22 could be based on known phase-locked loop techniques and the filter of unit 24 could be tuned to a cut-off frequency of the order of 150 Hz. These conditions can easily be established on the basis of knowledge available in the art, so that the output voltage of generator 4 can be successfully demodulated without giving rise to aliasing during detection.

It will be understood that the above description of the present invention is susceptible to various modifications, changes, and adaptations, and the same are intended to be comprehended within the meaning and range of equivalents of the appended claims.

What is claimed is:

1. Apparatus for detecting torsional vibrations of the shaft of an exciter of a turbine-generator, said apparatus comprising: a permanent magnet generator connected to be driven by the exciter shaft and having an electrical output for providing an output voltage having a frequency proportional to the rate of rotation of the exciter shaft; and signal processing means connected to said electrical output for deriving a signal representative of torsional vibrations experienced by the exciter shaft.

2. Apparatus as defined in claim 1 wherein said permanent magnet generator has a rotatable shaft forming a common unit with the shaft of the exciter.

3. Apparatus as defined in claim 2 wherein said signal processing means comprise an fm demodulator connected to receive the output voltage provided by said electrical output of said permanent magnet generator, and circuit means including an amplifier and a low-pass filter having an input connected to receive the demodulated signal produced by said demodulator and an output providing an analog signal having an amplitude proportional to low frequency components of the output voltage.

4. Apparatus as defined in claim 3 wherein said low-pass filter has a cut-off frequency of the order of 150 Hz.

5. Apparatus as defined in claim 4 wherein said permanent magnet generator is constructed to have an output voltage frequency of the order of 420 Hz when the turbine generator is rotating at rated speed.

6. Apparatus as defined in claim 1 wherein said permanent magnet generator is mounted on the shaft of the exciter and is located adjcent the exciter.

7. Apparatus as defined in claim 6 wherein the spacing between said permanent magnet generator and the exciter, along the shaft, is no greater than 60 cm.

8. A method for detecting torsional vibrations of the shaft of an exciter of a turbine-generator, comprising: connecting the shaft of a permanent magnet generator to the exciter shaft for rotation in unison therewith, the permanent magnet generator having an electrical output for providing an output voltage having a frequency proportional to the rate of rotation of the exciter shaft; frequency demodulating the output voltage produced by the permanent magnet generator in response to rotation of the exciter shaft to produce an output signal having an amplitude proportional to the frequency of the output voltage; and effecting low-pass filtering of the output signal to produce a filtered signal having an amplitude representative of the frequency of low frequency components in the output voltage.

9. A method as defined in claim 8 wherein said step of effecting low-pass filtering is performed with a cut-off frequency of the order of 150 Hz.

10. A method as defined in claim 8 further comprising effecting frequency analysis of the filtered signal.

* * * * *